(12) United States Patent
Weldon et al.

(10) Patent No.: US 7,608,952 B2
(45) Date of Patent: *Oct. 27, 2009

(54) USE OF PFPE LUBRICANT IN AUTOMOTIVE APPLICATIONS

(75) Inventors: Craig Andrew Weldon, Chatham (CA); Calvin Wang, Chatham (CA)

(73) Assignee: Continental Automotive Canada, Inc., Chatham, Ontario (CA)

( * ) Notice: Subject to any disclaimer, the term of this patent is extended or adjusted under 35 U.S.C. 154(b) by 112 days.

This patent is subject to a terminal disclaimer.

(21) Appl. No.: 11/882,614

(22) Filed: Aug. 3, 2007

(65) Prior Publication Data

US 2008/0029343 A1   Feb. 7, 2008

Related U.S. Application Data

(60) Provisional application No. 60/821,483, filed on Aug. 4, 2006.

(51) Int. Cl.
*H02K 7/06* (2006.01)

(52) U.S. Cl. ............................ 310/80; 384/462; 508/182

(58) Field of Classification Search ................ 310/90, 310/80, 45; 184/6; 123/41.04; 508/582; 384/462

See application file for complete search history.

(56) References Cited

U.S. PATENT DOCUMENTS

| 4,209,722 A * | 6/1980 | Peachee, Jr. ................. 310/90 |
| 4,618,791 A * | 10/1986 | Morrill et al. ................. 310/90 |
| 6,432,887 B1 * | 8/2002 | Yamamoto et al. .......... 508/138 |
| 7,265,080 B2 * | 9/2007 | Iso et al. ..................... 508/182 |
| 2005/0152628 A1 * | 7/2005 | Egami et al. ................ 384/462 |
| 2008/0121833 A1 * | 5/2008 | Weldon et al. .............. 251/264 |

OTHER PUBLICATIONS

Nye Lubricants, Inc., NYE UNIFLOR™ 8961 Data Sheet, Nov. 2002.
Nye Lubricants, Inc., NYE UNIFLOR™ 8960 Data Sheet, Dec. 2002.

* cited by examiner

*Primary Examiner*—Michael C Zarroli

(57) ABSTRACT

A motor (10) for a vehicle includes a stator assembly (14) and a rotor assembly (16). Bearing structure (20, 22) support the rotor assembly to permit rotation of the rotor assembly with respect to the stator assembly. A shaft (30) is threadedly engaged with the rotor assembly and is constructed and arranged such that rotation of the rotor assembly causes linear movement of the shaft. A perfluoropolyether (PFPE) based lubricant (38), having an thermal functionality upper temperature limit of over +200° C., lubricates at least the bearing structure.

8 Claims, 1 Drawing Sheet

USE OF PFPE LUBRICANT IN AUTOMOTIVE APPLICATIONS

This application claims the benefit of the earlier filing date of U.S. Provisional Application No. 60/821,483, filed on Aug. 4, 2006, which is hereby incorporated by reference into this specification.

FIELD OF THE INVENTION

The invention relates to lubricating parts in automotive applications and, more particularly, to using Perfluoropolyether (PFPE) based grease and/or oil as the lubricant.

BACKGROUND OF THE INVENTION

In conventional Idle Air Control Valves (IACV) for vehicles, two lubricants are used in the core motor of the IACV, bearing oil and shaft grease. The conventional bearing oil is polyphenylmethyldimethylsiloxane fluid and is used in the open ball bearings of the IACV. The conventional shaft grease is a fluid grade silicone thickened with lithium soap that lubricates the shaft/rotor lead screw and the front journal bearing of the IACV. The IACVs manifold ambient environment specification is defined −40° C. to +125° C., typical heat for automotive under-hood parameters. The silicone based oil and grease are at times suitable when the IACV is mounted external to the intake manifold of a vehicle's engine.

A recent application of the IACV changed mounting from external to the intake manifold to insertion into the manifold. This application change led to a packaging change of the core motor. The IACV's zinc die cast housing was replaced with a plastic sleeve. The material change combined with the insertion into manifold reduced the heat transfer capabilities of the core motor. The core motor is an electrical device that generates internal heat when operational. CAE analysis calculated the IACV's ball bearing temperature reaches upwards of +200° C., due to internal heat build up and heat transfer losses due to mounting.

During testing at a dynamic thermal life cycle −40° C. to +125° C., several core motors lost functionality. Brown crystalline residue was found in the ball bearings. It was unknown if this residue was from material thermal degradation, contamination, or the phase change of the silicone fluid to silica solid. Discoloration of the shaft grease was also observed but it was not determined if the color change is degradation, contamination, evaporation, separation or absorption of by-products. Moisture has a major destructive influence on lithium soap grease. Root causes affecting bearing seizure are believed to be a combination of high temperature and moisture condensate in a dynamic (cycling) environment.

The conventional silicone base lubricants used in the IACV have a thermal functionality range of approximately −75° C. to +200° C. When the thermal capabilities of silicone fluids are exceeded, polymerization can occur such as physical change of the silicone fluid to silica solid. When polymerization occurs, the lubricant breaks down failing to provide the lubrication barrier between moving surfaces.

As is evident from the test results and the apparent thermal limitation of the production lubricants, there is a need for an alternate lubricant for an IACV to ensure the warranty capability of the IACV motor.

SUMMARY OF THE INVENTION

An object of the invention is to fulfill the need referred to above. In accordance with the principles of the present invention, this objective is obtained by providing a motor for vehicle. The motor includes a stator assembly, a rotor assembly and bearing structure supporting the rotor assembly to permit rotation of the rotor assembly with respect to the stator assembly. A shaft is threadedly engaged with the rotor assembly and is constructed and arranged such that rotation of the rotor assembly causes linear movement of the shaft. A perfluoropolyether (PFPE) based lubricant, having a thermal functionality upper temperature limit of over +200° C., lubricates at least the bearing structure.

In accordance with another aspect of the disclosed embodiment, an automotive assembly includes a component having at least one element requiring lubrication. A perfluoropolyether (PFPE) based lubricant, having a thermal functionality upper temperature limit of over +200° C., lubricates the element.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing, wherein like reference numerals refer to like parts, in which.

DETAILED DESCRIPTION OF THE EXEMPLARY EMBODIMENT

Figure 1:
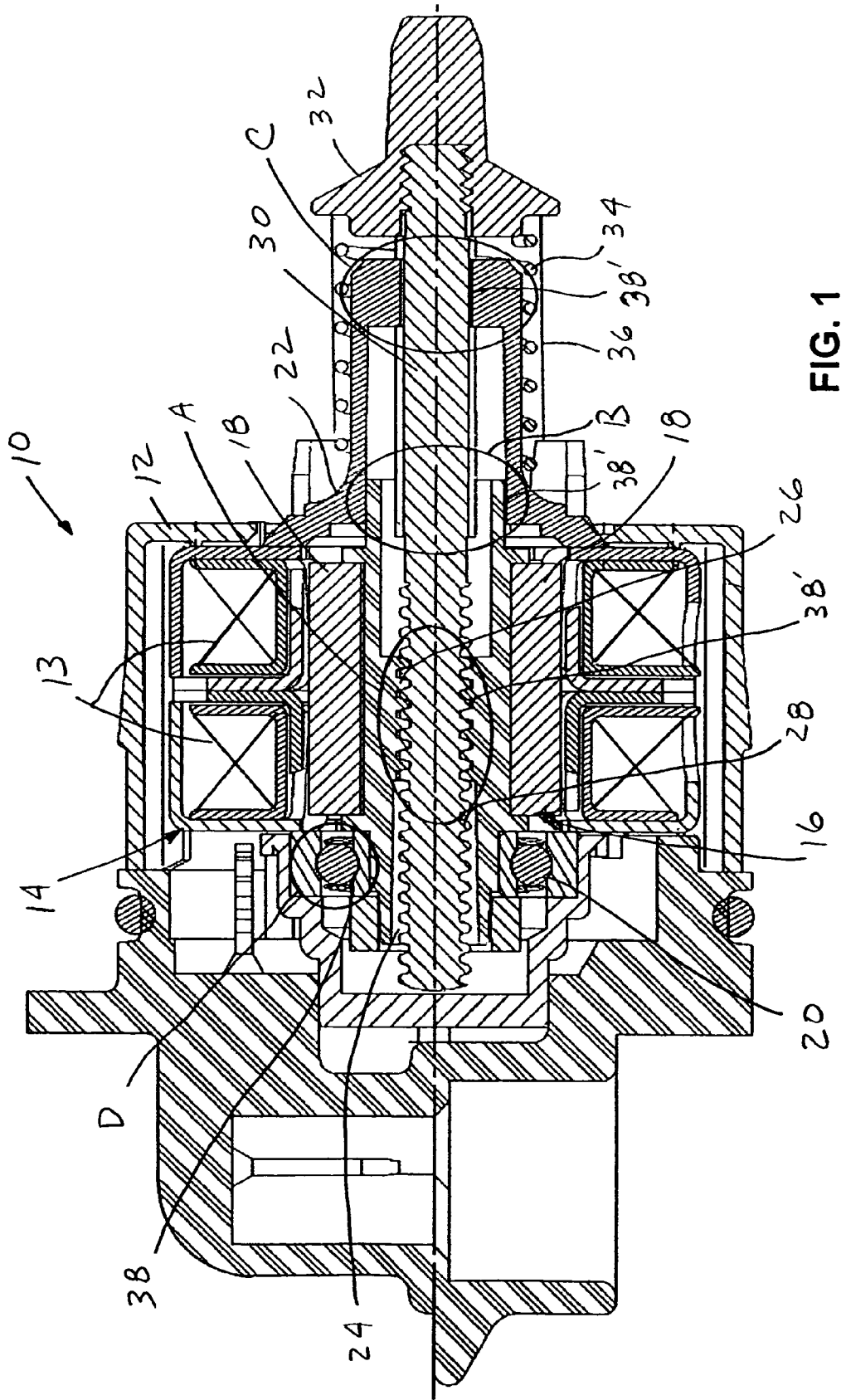
FIG. 1 is a sectional view of a motor of an idle Air Control Valves (IACV) using PFPE lubricant in accordance with an embodiment of the present invention.

Before turning to the preferred embodiment, it should be understood that the present invention may take many forms in a variety of automotive assemblies employing a lubricant to lubricate moving parts. For illustrative purposes, throughout the following discussion the invention is described as it is incorporated into a particular magnetic device used in a specific product assembly, namely an electric motor 10 in the form of a stepper motor that provides linear actuation for an idle air control valve assembly.

With reference to FIG. 1, a motor, generally indicated at 10, of an Idle Air Control Valve (IACV) for use in a vehicle is shown in accordance with an embodiment of the present invention. The motor 10 includes a housing 12. A stator assembly, generally indicated at 14, is disposed in the housing 12. The stator assembly 14 includes the conventional windings 13, field cups, pole plates, and bobbins.

As shown in FIG. 1, a rotor assembly, generally indicated at 16, is associated with the stator assembly 14. The rotor assembly 16 has the conventional permanent magnet 18 generally adjacent to the windings 13. Bearing structure, including a rear, open ball bearing 20 and a front bearing 22 supports the rotor assembly 16 to permit rotation of the rotor assembly 16 relative to the stator assembly 14. Ball bearing 20 can be a sealed, lubricated bearing. In this embodiment of motor 10 as a stepper motor, introduction of a current in the coil windings 13 of the stator assembly 14 causes rotational movement of the rotor assembly 16. The rotor assembly 16 has a passage 24 there-through including a threaded portion 26 for engagement with a threaded portion 28 of shaft 30. The distal end of the shaft 30 is associated with the front bearing 22, preventing shaft rotation. Therefore, rotational motion of rotor assembly 16 is converted into linear motion of shaft 30, making this stepper motor a linear actuator.

In the embodiment of the motor 10 used in an idle air control valve, the shaft 30 has an integral pintle 32 at its distal end. A spring 34 tends to bias the pintle 32 in an extended position. The pintle 32 receives a cylindrical grime shield 36 to protect against contamination of the motor 10.

Certain parts of the motor 10 need to be lubricated. As noted above, the use of silicone based lubricants have caused failure of motors when operating at high temperate and/or in chemical or solvent exposed environments. Thus, in accordance with the embodiment, a perfluoropolyether (PFPE) based lubricant is employed in the motor 10. More particularly, a PFPE oil, preferably NYE UNIFLOR™ 8960, manufactured by Nye Lubricants, Inc. of Fairhaven, Mass. is used as a lubricant 38 to lubricate the rear bearing 20 encircled at D. In addition, PFPE grease, preferably NYE UNIFLOR™ 8961, manufactured by Nye Lubricants, Inc. is used as a lubricant 38' to grease for example, the rotor and shaft threads encircled at A, the rotor and front bearing journal encircled at B, and the shaft and front bearing anti-rotate area, encircled at C. Other tradenames of suitable PFPE lubricants include FOMBLIN®. Any PFPE based lubricant can be employed that can withstand greater than 200° C. temperature. In the embodiment, the PFPE lubricants 38, 38' have a thermal functionality range of approximately −90° C. to +250° C. For automotive applications such as described, a functionality range of about −60 to +250° C. is acceptable. PFPE lubricants are a completely fluorinated which provide thermal, chemical and oxidative stability. The use of a PFPE lubricant for the bearing oil eliminates the effects of fluids and temperature as found during testing.

Although the lubricants 38, 38' were described for use in a motor 10 of an IACV, the lubricants 38, 38' are equally applicable to other automotive assemblies that are exposed to temperatures above 200° C. and/or chemical or solvent exposed environments. For example, the lubricants 38, 38' can be employed in extreme temperature applications that silicone cannot survive such as Exhaust Gas Recirculation (EGR) valves, radiator cooling fans, spark plug boots, etc. The lubricant can also be used in chemical or solvent exposed environments that silicone based grease does not survive or silicone based grease is not permitted such as evaporator purge valves, electronic throttle control, air control valves, fuel lever sensors, fuel systems in "flex" fuel vehicles, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A motor for vehicle, the motor comprising:
    a stator assembly,
    a rotor assembly,
    bearing structure supporting the rotor assembly to permit rotation of the rotor assembly with respect to the stator assembly,
    a shaft, threadedly engaged with the rotor assembly and constructed and arranged such that rotation of the rotor assembly causes linear movement of the shaft, and
    a perfluoropolyether (PFPE) based lubricant, having an upper temperature limit of over 200° C. but less than or equal to about 250° C., lubricating at least the bearing structure.

2. The motor of claim 1, wherein the bearing structure includes a front bearing and an open, rear ball bearing, the lubricant lubricating the rear ball bearing being a PFPE oil and the lubricant lubricating the front bearing being a PFPE grease.

3. The motor of claim 1, wherein the lubricant further lubricates the threaded engagement of the shaft and rotor assembly.

4. The motor of claim 3, wherein the lubricant lubricating the threaded engagement of the shaft and rotor assembly is a PFPE grease.

5. The motor of claim 1, wherein an end of the shaft is associated with the front bearing defining an anti-rotate area, and where the lubricant further lubricates the anti-rotate area.

6. The motor of claim 5, wherein the lubricant lubricating the anti-rotate area is a PFPE grease.

7. The motor of claim 1, wherein a temperature range of the PFPE lubricant is about −90 to +250° C.

8. The motor of claim 1, wherein the motor is constructed and arranged to be part of an idle air control valve.

* * * * *